(12) United States Patent
Abullarade et al.

(10) Patent No.: US 7,188,196 B2
(45) Date of Patent: Mar. 6, 2007

(54) METHOD AND APPARATUS FOR PLAYING ANALOG AUDIO TO MULTIPLE CODEC OUTPUTS

(75) Inventors: Jorge Abullarade, Austin, TX (US); Nael Hirzalla, Austin, TX (US); William Patrick Kelly, Pflugerville, TX (US)

(73) Assignee: Cirrus Logic, Inc., Austin, TX (US)

( * ) Notice: Subject to any disclaimer, the term of this patent is extended or adjusted under 35 U.S.C. 154(b) by 51 days.

(21) Appl. No.: 11/171,004

(22) Filed: Jun. 29, 2005

(65) Prior Publication Data
US 2006/0010267 A1    Jan. 12, 2006

Related U.S. Application Data

(62) Division of application No. 09/860,426, filed on May 18, 2001, now abandoned.

(51) Int. Cl.
G06F 13/28 (2006.01)
G06F 13/00 (2006.01)
G06F 13/38 (2006.01)
G06F 3/00 (2006.01)
H03M 1/00 (2006.01)

(52) U.S. Cl. .............. 710/22; 710/1; 710/20; 710/21; 710/33; 710/52; 710/62; 710/65; 710/69; 710/72; 710/73; 710/74; 710/303; 710/304; 375/221; 341/108; 341/110; 341/126; 341/144; 341/155; 381/119; 381/300

(58) Field of Classification Search ........ 710/1, 710/20–22, 33, 52, 62, 65, 69, 72–74, 303, 710/304; 370/249; 379/22.01, 67.1; 375/219, 375/221; 341/108, 110, 126, 144, 155; 381/119, 381/300
See application file for complete search history.

(56) References Cited

U.S. PATENT DOCUMENTS

| | | | |
|---|---|---|---|
| 5,590,377 A * | 12/1996 | Smith | 710/22 |
| 5,862,450 A | 1/1999 | Mandal et al. | 725/91 |
| 5,875,233 A | 2/1999 | Cox | 379/88.07 |
| 5,968,148 A | 10/1999 | Priem | 710/62 |
| 6,007,228 A | 12/1999 | Agarwal et al. | 700/94 |
| 6,044,150 A | 3/2000 | Rigstad et al. | 379/387.02 |
| 6,119,239 A | 9/2000 | Fuji | 713/320 |
| 6,393,572 B1 | 5/2002 | Datta et al. | 713/322 |
| 6,401,152 B1 | 6/2002 | Solomon et al. | 710/104 |
| 6,609,170 B1 | 8/2003 | Lehwalder et al. | 710/301 |

* cited by examiner

Primary Examiner—Tanh Q. Nguyen
(74) Attorney, Agent, or Firm—Steven Lin, Esq.

(57) ABSTRACT

Method and apparatus for playing analog audio in an electronic audio system having multiple audio codecs, only one of which has a direct hardware connection to the analog audio source. First analog audio data is received from the analog audio source at a first audio codec, and converted to digital audio data using the first audio codec. The digital audio data is stored in a memory, and read back from the memory, transferred to a second audio codec. The digital audio data is then converted to second analog audio data using the second audio codec, and output from the second audio codec. An audio controller may be used to store the digital audio data in a loopback buffer within the memory, read the digital audio data from the loopback buffer, and may further be programmed to operate in a prepare loopback state, a loopback running state, and a recording state.

11 Claims, 6 Drawing Sheets

METHOD AND APPARATUS FOR PLAYING ANALOG AUDIO TO MULTIPLE CODEC OUTPUTS

This application is a divisional application of U.S. patent application Ser. No. 09/860,426 entitled "METHOD AND APPARATUS FOR PLAYING ANALOG AUDIO TO MULTIPLE CODEC OUTPUTS" filed on May 18, 2001, abandoned, and having inventors Jorge Abullarade, Nael Hirzalla, and William Kelly.

BACKGROUND OF THE INVENTION

1. Field of the Invention

The present invention generally relates to electronic digital signal processing, specifically audio controllers, and more particularly to an improved audio subsystem for a computer.

2. Description of the Related Art

In the past, personal computers had only a single speaker which provided audio output to the user. The quality of the sound output provided by the speaker was quite poor. Add-on sound boards have been used to enhance the sound quality of personal computers by supporting multiple speakers and stereo sound. The add-on boards were typically used to enhance the sound quality for, e.g., game programs.

More recently, audio coder/decoders (codecs) have been used in personal computers to provide stereo input and output capabilities with sound quality on the order of that provided by compact discs (CDs). The codec's function is to compress and un-compress the audio data, or to convert analog audio signals to a digital format, and digital audio signals to an analog format.

Early codecs converted analog signals at an 8 kHz rate into 8-bit pulse-coded modulation (PCM) for use primarily in telephony. More recently, the efficiency and low cost advantages of codecs have been expanded to convert analog signals at a 48 kHz sampling rate into 16-bit stereo (and even up to 20-bit stereo) for higher quality use beyond that required for telephony. With higher quality audio capability, today's codecs find practical application in consumer stereo equipment including CD players, modems, computers and digital speakers. Conventional codec devices provide, for example, 16-bit audio data over an 8-bit parallel interface between the codec and various computer interconnect architectures, such as the industry standard architecture (ISA), extended industry standard architecture (EISA), or peripheral component interconnect (PCI). These devices also provide analog-to-digital (ADC) and digital-to-analog (DAC) conversions of stereo audio signals, and certain mixing functions.

One exemplary audio codec is the CS4297A multimedia audio codec manufactured by the Crystal Computer Audio Division of Cirrus Logic of Austin, Tex. That codec is compliant with the "Audio Codec '97 Component Specification" (AC '97) which was co-developed by Analog Devices, Inc., Creative Labs, Inc., Intel Corp., National Semiconductor Corp., and Yamaha Corp. The AC '97 specification defines a high-quality, 16-bit audio architecture for the personal computer (PC) that is used in the majority of today's desktop platforms. AC '97 is designed for a two-chip audio architecture, and enables high-quality audio at a price affordable for PC manufacturers. AC '97 has unified the market around a common architecture for next-generation consumer electronics quality PC audio systems mainly based around new interconnect buses like PCI, USB (universal serial bus), and "1394." The AC '97 options help integrate the components necessary to support next-generation, audio-intensive applications such as DVD, 3-D multiplayer gaming, and interactive music.

Figure 1:
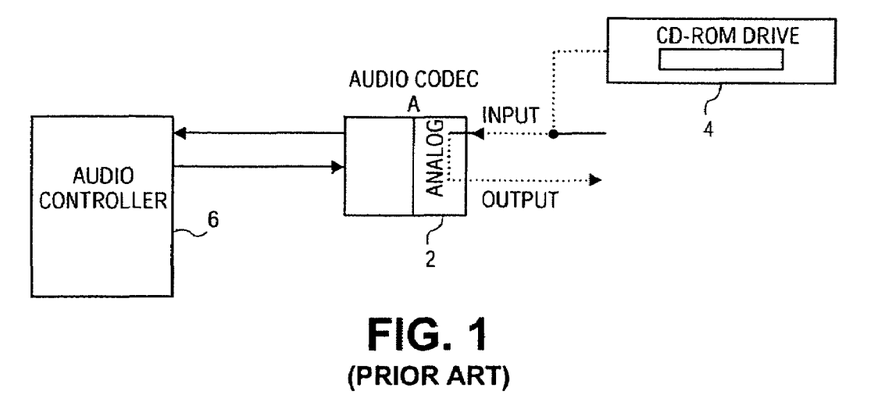
FIG. 1 is a high-level block diagram illustrating a conventional audio subsystem for an electronic device, such as a personal computer.
Figure 2:
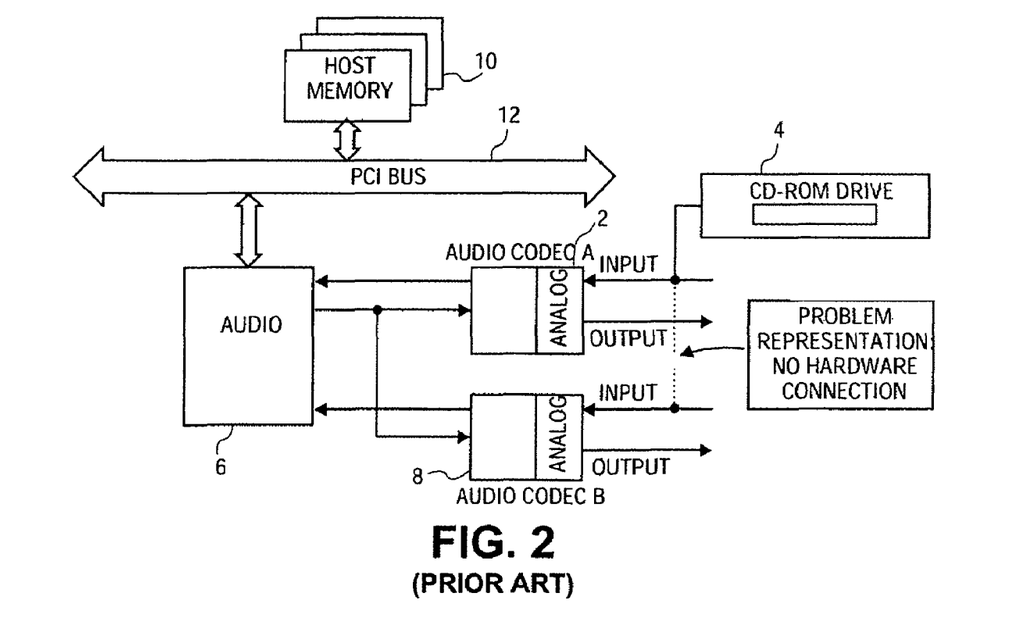
FIG. 2 is a high-level block diagram illustrating a conventional computer system wherein two audio codecs are provided as part of the audio subsystem, with only one audio codec directly connected to the analog audio source (e.g., a CD-ROM drive), such as might occur when a portable computer having an internal audio codec is connected to a docking station having a separate audio codec.

In a typical PC audio subsystem, analog audio is input from an analog source, passed through the analog mixer, and then output. FIG. 1 illustrates such an audio subsystem with an AC '97 codec 2 playing analog audio sourced from a CD player 4. An audio controller 6 is also used to manage the AC '97 codec. A problem arises, however, when multiple AC '97 audio codecs are connected to the same audio controller. This situation may occur, for example, when a portable computer (i.e., laptop or notebook computer) is coupled to a computer docking station. The computer has one built-in codec, and the docking station may have a separate codec. As further shown in FIG. 2, only one codec 2 (codec A) provides the analog hardware connections. In this situation, it is not possible to directly transfer the analog audio captured by audio codec 2 to the rest of the audio codecs, such as codec 8 (codec B). FIG. 2 also illustrates the manner in which the audio controller 6 is connected to the computer's host memory 10 via a PCI bus 8.

Unfortunately, many prior art devices provide no hardware connection between the analog source and the inputs of the additional codecs. It would, therefore, be desirable to provide a solution which would allow the analog audio to be output from any codec in the system, notwithstanding the lack of a direct hardware connection. It would be further advantageous if the solution were available for systems with limited resources, such as audio subsystems which have a limited number of direct memory access (DMA) channels.

SUMMARY OF THE INVENTION

The foregoing objects are achieved in a method of playing analog audio in an electronic audio system, comprising the steps of receiving first analog audio data from an analog audio source at a first audio codec, converting the first analog audio data to digital audio data using the first audio codec, storing the digital audio data in a memory device, reading the digital audio data from the memory device, transferring the digital audio data, after said reading step, to all audio codecs, converting the digital audio data to analog audio data using the DACs in the audio codecs, and outputting the analog audio data from the audio codecs. An audio controller may be used to store the digital audio data in a loopback buffer within the memory device, and to read the digital audio data from the loopback buffer. The audio controller can also mix the digital audio data with other digital audio data from the memory device. The method can be applied to a system having more than two codecs, i.e., the digital audio data may additionally be transferred to a third audio codec where the digital audio data is converted to third analog audio data, and the third analog audio data is output from the third audio codec. In a particularly advantageous implementation, the first audio codec is part of a portable computing system, and the second codec is integrated into a docking station which is adapted to operably receive the portable computing system. The audio controller may further be programmed to operate in at least three different states including a prepare loopback state, a loopback running state, and a recording state.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 3:
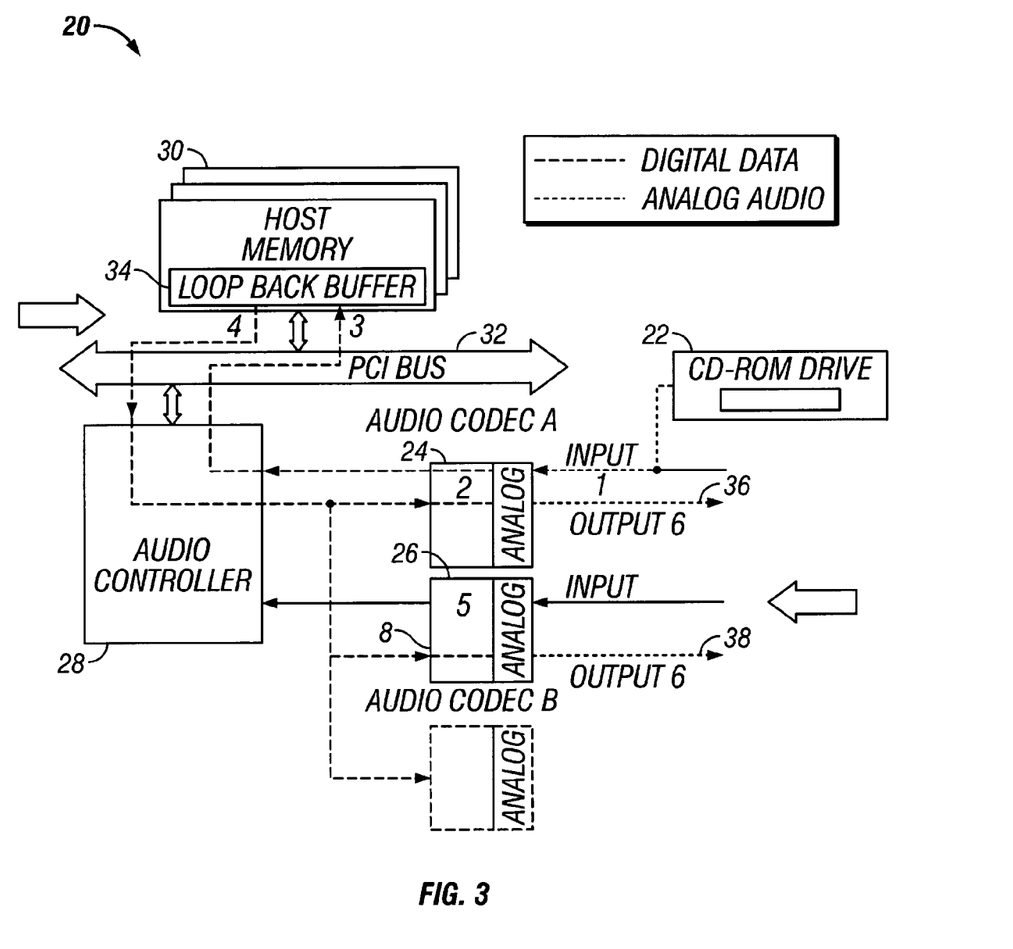
FIG. 3 is a high-level block diagram illustrating one embodiment of an audio subsystem constructed in accordance with the present invention, wherein an audio controller transfers digital audio data from one audio codec to a loop back buffer in the computer's memory, and then reads the data and forwards it to the second audio codec for output.

With reference now to the figures, and in particular with reference to FIG. 3, there is depicted one embodiment 20 of a computer system constructed in accordance with the present invention. Computer system 20 is generally comprised of a CD-ROM drive 22, a first audio codec 24 (codec A), at least one other audio codec 26 (codec B), an audio controller 28, and host memory 30 which is interconnected with audio controller 28 via a PCI bus 32. Computer system 20 may include other conventional elements, such as one or more processors, a user input device (e.g., keyboard or mouse), a user output device (e.g., a display monitor), and various adapter cards for supporting these other elements.

When the audio needs to be played out of multiple codecs, the analog audio is routed to the audio codec capture path where it is converted to digital data and transferred from an audio codec to the host memory 30 via the audio controller chip. In order to send the data to multiple codecs, audio controller 28 reads the captured digital data from a loop back buffer within the host memory, and transfers the data to each audio codec, where the digital data is converted back to analog and sent to the audio outputs. Under software control, audio codec 24 first captures the analog CD audio, and then converts the analog CD audio to digital data. Audio controller 28 writes the digital CD data to loop back buffer 34, and shortly thereafter reads the digital data from loop back buffer 34. Audio controller 28 then transfers the digital CD data to codecs 24 and 26, and the audio codecs convert the digital data to an analog format and forward the analog audio to outputs 36, 38. As indicated by the dashed lines in FIG. 3, the audio controller may forward the digital data to more than two codecs.

Figure 4:
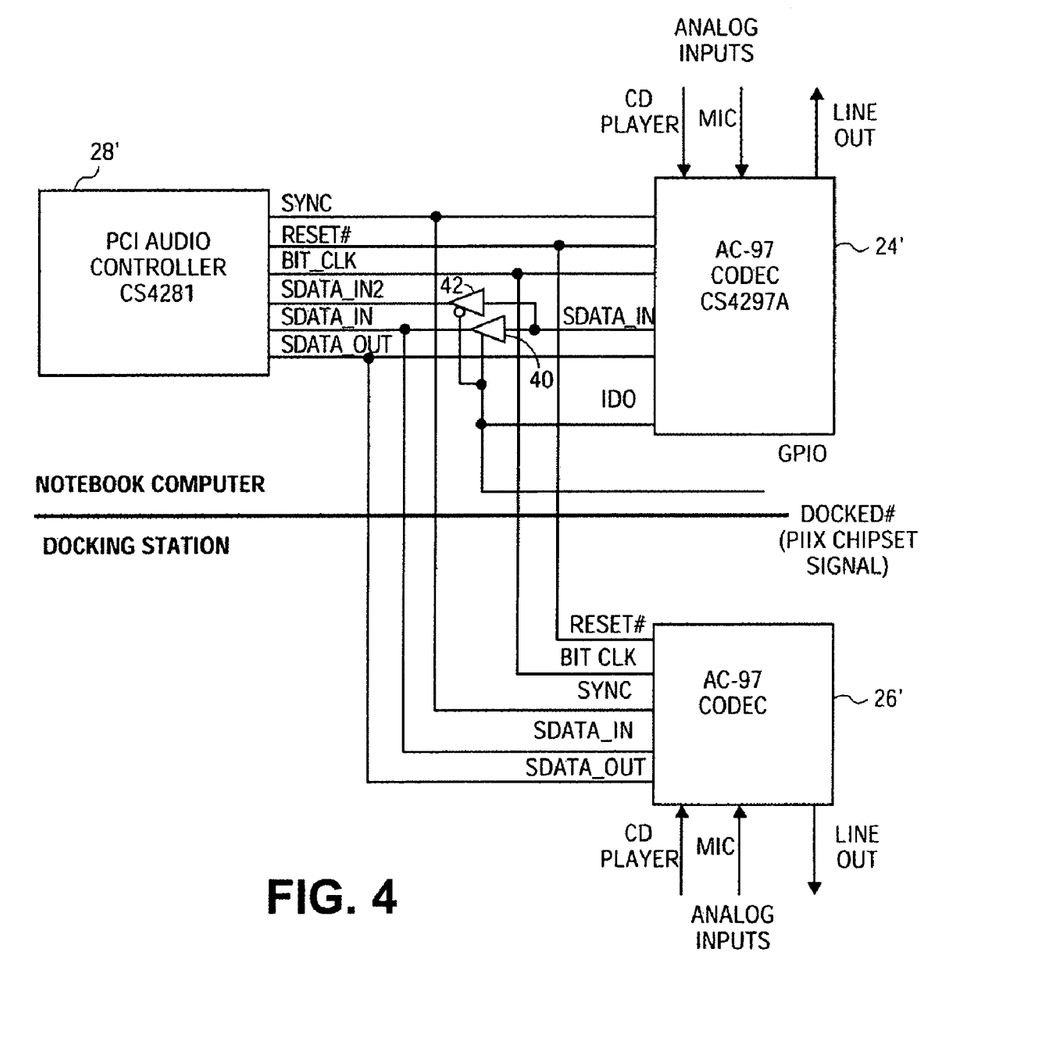
FIG. 4 is a block diagram showing additional details for a specific embodiment of the audio subsystem of the present invention, wherein a notebook computer is coupled to a docking station.

FIG. 4 illustrates in more detail a specific embodiment for the audio subsystem of the present invention. In this embodiment, the audio controller 28' and first audio codec 24' are part of a portable (e.g., laptop, notebook, or palmtop) computing system, while the second audio codec 26' is integrated into a docking station which is adapted to receive the portable computer. Each of the codecs is an AC '97 codec, particularly the AC '97 codec sold by Cirrus Logic, Inc., as part number CS4297A. Audio controller 28' is the PCI audio controller sold by Cirrus Logic, Inc., as part number CS4281. Each of the codecs has a CD player input, a microphone input, and a line output. A sync (synchronization) pin of each codec 24', 26' is connected to the sync pin of audio controller 28'. A reset pin of each codec 24', 26' is connected to the reset pin of audio controller 28'. A clock pin (BIT_CLK) of each codec 24', 26' is connected to the clock pin of audio controller 28'. A serial data output pin of codec 24' is connected to a first data input pin of audio controller 28' via buffer 40, and to a second data input pin of audio controller 28' via another buffer 42. Signal ID0 specifies whether codec 24' is he primary codec or the secondary codec. The serial data output line of audio controller 28' is connected to the data input lines of codecs 24' and 26'.

The system may have one or more speakers connected to the line out of the docking station's audio codec. A jack may optionally be provided (not shown) to allow external speakers or headphones to be plugged into the system. The output path for the analog audio may be automatically enabled based on the state of the system (docked or not docked).

Audio controller 28' may also provide the function of mixing other digital audio data from the host. Audio controller 28' can use a DMA engine to transfer and mix the CD audio data back into the AC '97 codecs.

There are some audio systems that are limited in the number of DMA channels provided, whether for playback or capture. The state diagram of FIG. 5 describes an exemplary system with a single DMA channel for capture. This channel can be used either for the loopback, or for general recording. When the system starts, it is in the "Prepare Loopback" state. In this state, the process starts after allocating the necessary host loop back buffer, while checking on the availability of one playback DMA channel and one capture DMA channel. Should both exist, the process continues to the "Loopback Running" state. For power savings, the loopback procedure may be stopped if the analog audio need not be heard (e.g., by muting the system master volume or the analog source). If this happens, the system returns to the "Prepare Loopback" state.

Figure 5:
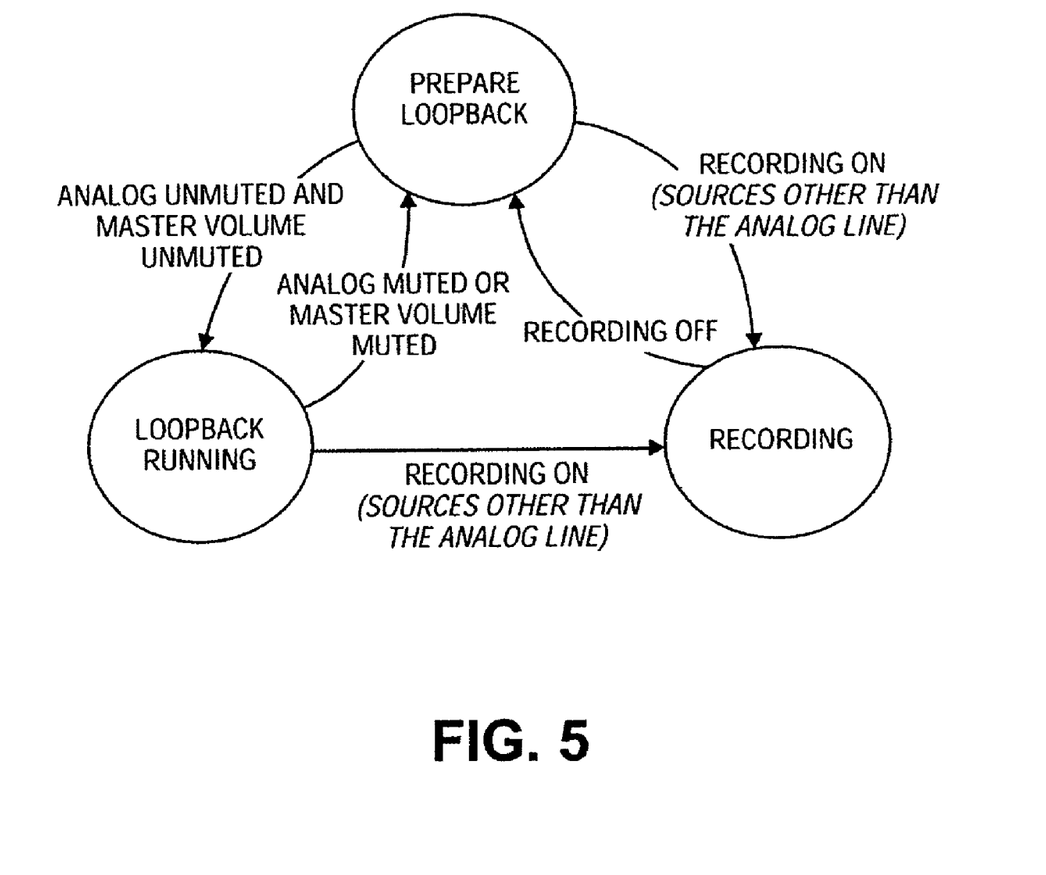
FIG. 5 is a state diagram describing an exemplary system of the present invention with a single DMA channel for capture.

In the illustrative scenario, recording is considered a higher priority requirement over the loopback process. Hence, if any recording commences in-a system with one capture DMA channel, that channel will be freed by the loopback process, and reallocated by the recording process. The system at this time is in the "Recording" state. If the analog audio happens to be the source for recording, both the recording process and the loopback process can share the capture DMA, and the system is considered as residing in the "Loopback Running" state.

Figure 6:
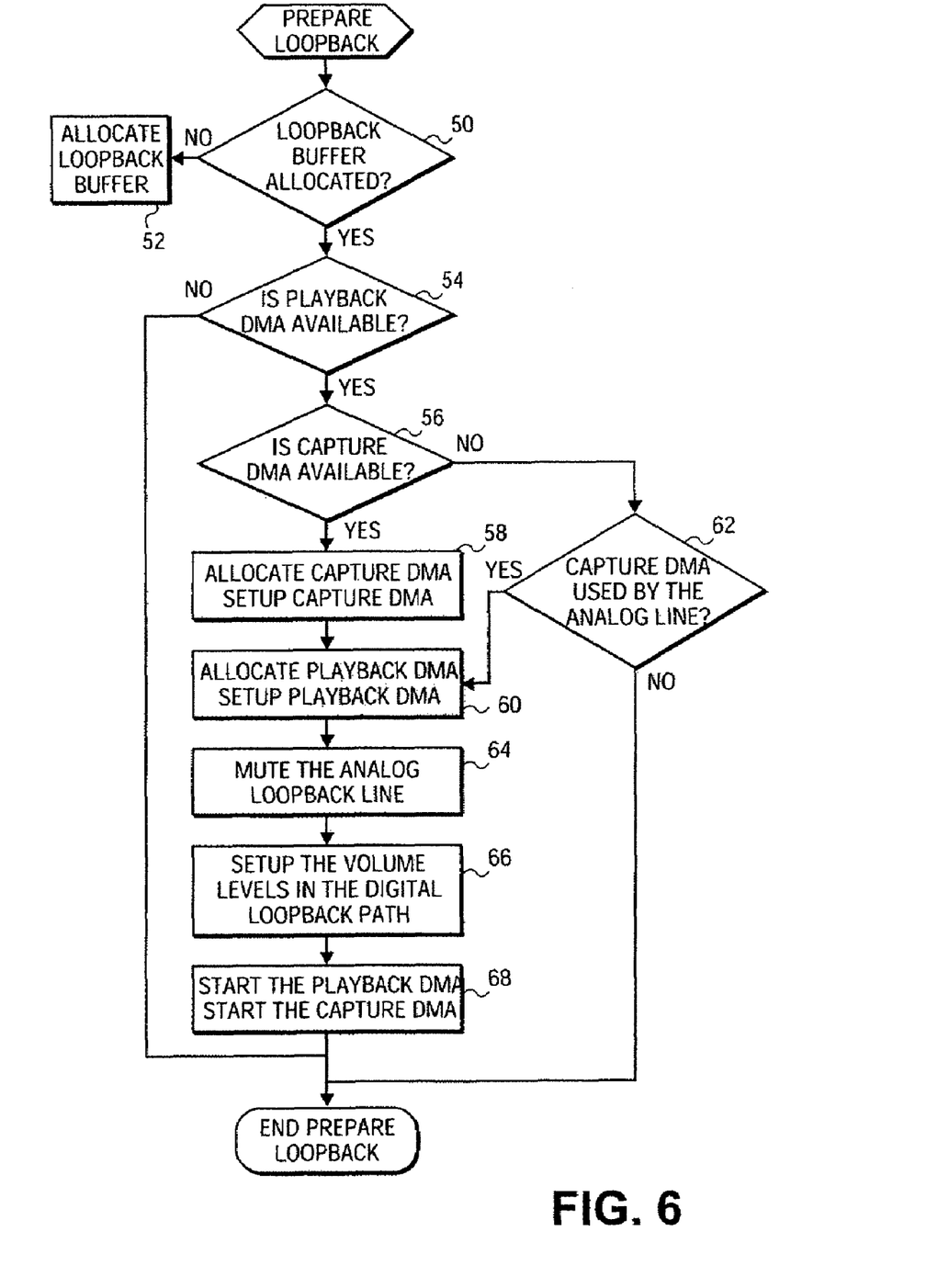
FIG. 6 is a chart illustrating the logical flow for the preparation of the loopback, in accordance with one implementation of the present invention.
Figure 7:
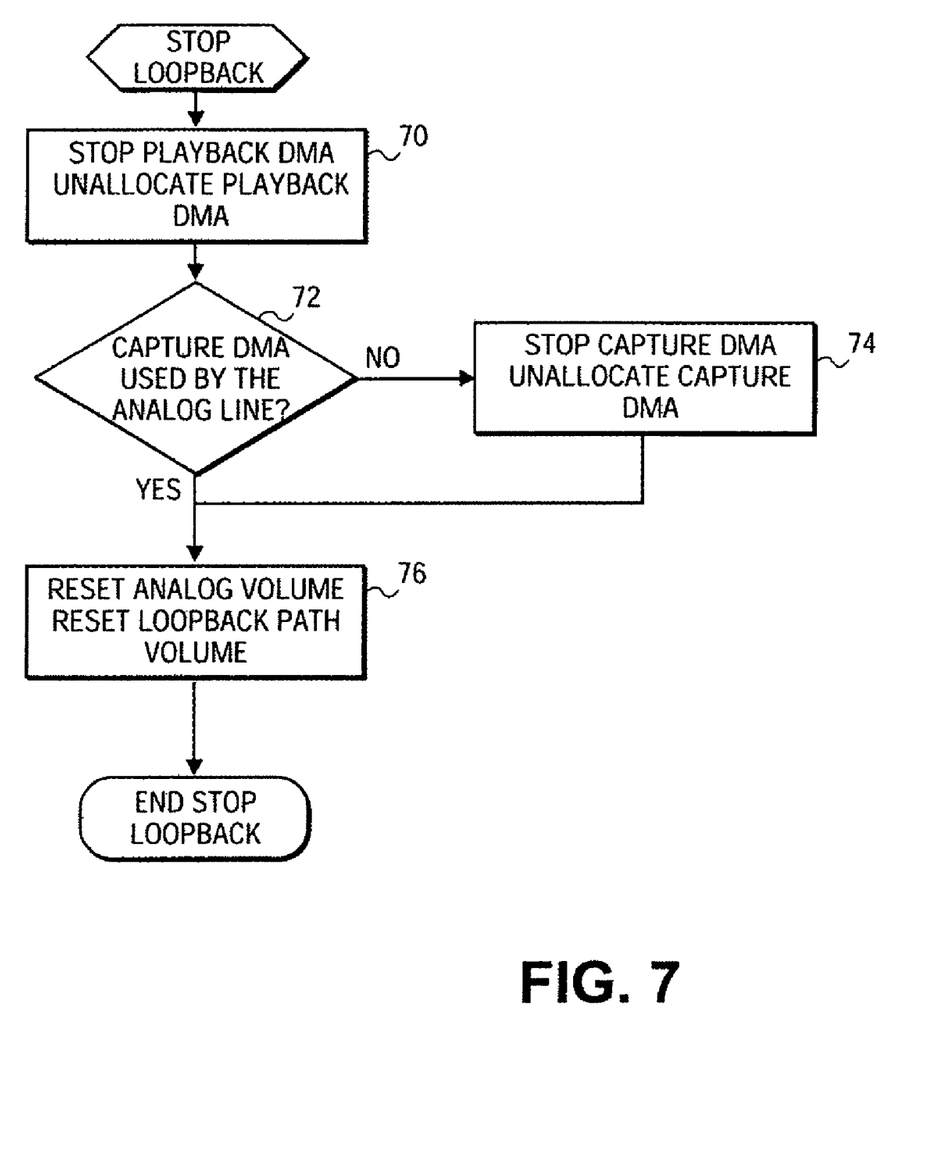
FIG. 7 is a chart illustrating the logical flow to stop the loopback, in accordance with one implementation of the present invention.

This specific implementation of the present invention may be further understood with reference to the flow charts of FIGS. 6 and 7. FIG. 6 illustrates the flow for preparing the loopback. The process begins by checking to see whether the loopback buffer has already been allocated (50). If not, then the buffer is allocated (52). The process continues by checking to see whether a playback DMA channel is available (54). If not, then loopback preparation ends. If so, a determination is next made as to whether a capture DMA channel is available (56). If a capture DMA channel is available, that channel is allocated and set up (58) setup, by writing value to configuration bits of the audio controller. Thereafter, a playback DMA channel is allocated and setup (60). If the determination of step 56 indicates that no capture DMA channel is available, a further decision can be made as to whether a capture DMA channel is being used by the analog line (62). If not, then loopback preparation again ends, otherwise, the process continues at step 60. The analog loopback line is then muted (64), and the volume levels are set for the digital loopback path (66), that is, the volume sliders that control the analog loopback path will start controlling the digital loopback path. The playback and capture DMA channels may then be started (68), thereby completing the flow of the loopback preparation.

FIG. 7 illustrates the flow for stopping the loopback mechanism. The process begins by stopping the playback DMA channel, by writing to the DMA registers in the audio controller, and deallocating that channel (70). A determination is then made as to whether the capture DMA was being used by the analog line (72). If not, the capture DMA channel is stopped, and deallocated (74). Otherwise, the analog volume is reset, and the loopback path volume is reset (76), that is, the volume sliders will be mapped to the analog path rather than the digital path.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been discussed in the context of a computer system, it is also applicable to other digital signal processing applications, such as music compact disc players, digital video discs, telephony (wired or cellular), and videoconferencing. It is also understood that the present invention may be embodied in a computer program product having program instructions for carrying out the foregoing steps in a computer-readable medium (e.g., storage medium or transmission medium). It is therefore contemplated that such modifications can be made without departing from the spirit or scope of the present invention as defined in the appended claims.

What is claimed is:

1. A method of playing analog audio in an electronic audio system, comprising the steps of:
    receiving first analog audio data from an analog audio source at a first audio codec;
    converting the first analog audio data to digital audio data using the first audio codec;
    storing the digital audio data in a memory device;
    reading the digital audio data from the memory device;
    transferring the digital audio data, after said reading step, to a second audio codec;
    converting the digital audio data to second analog audio data using the second audio codec;
    outputting the second analog audio data from the second audio codec;
    allocating a loopback buffer in the memory device for storing the digital audio data;
    determining that at least one playback DMA channel and at least one capture DMA channel are available in the electronic audio system;
    in response to said determining step, allocating the at least one playback DMA channel and the at least one capture DMA channel for loopback processing;
    commencing an audio recording process; and
    in response to said commencing step, deallocating the at least one capture DMA channel from the loopback processing, and reallocating the at least one capture DMA channel for the audio recording process.

2. The method of claim 1 wherein the first audio codec is part of a portable computing system, and the second codec is integrated into a docking station which is adapted to operably receive the portable computing system, and further comprising the step of coupling the portable computing system to the docking station.

3. The method of claim 1, further comprising the steps of:
    muting an analog loopback line of the electronic audio system; and
    setting a volume level in a digital loopback path utilized for said reading step.

4. The method of claim 3, further comprising the steps of:
    stopping the at least one playback DMA channel; and
    resetting a volume level of the analog loopback line.

5. An electronic audio system comprising:
    an analog audio source;
    a first audio codec having an input connected to said analog audio source;
    a second audio codec;
    a memory device; and
    an audio controller having a data input connected to a data line of said first audio codec, and having a data output connected to a data line of said second audio codec, said audio controller programmed to receive digital audio data from said first audio codec, store the digital audio data in said memory device, read the digital audio data back from said memory device, transfer the digital audio data to the second audio codec, allocate a loopback buffer in said memory device for storing the digital audio data, determine that at least one playback DMA channel and at least one capture DMA channel are available in the electronic audio system, and in response to said determination, allocate the at least one playback DMA channel and the at least one capture DMA channel for loopback processing, commence an audio recording process, and in response to commencing the audio recording process, deallocate the at least one capture DMA channel from the loopback processing, and reallocate the at least one capture DMA channel for the audio recording process.

6. The electronic audio system of claim 5 wherein each of said first and second audio codecs are AC '97 compliant.

7. The electronic audio system of claim 5 wherein:
    said analog audio source, said first audio codec, said audio controller and said memory device are located within a portable computing system; and
    said second audio codec is located within a docking station which is coupled to said portable computing system.

8. The electronic audio system of claim 5 wherein said audio controller is further programmed to operate in at least three different states including a prepare loopback state, a loopback running state, and a recording state.

9. A computer program product for controlling the playing of analog audio in a computer system, the computer program product comprising:
    a computer-readable storage medium; and
    program instructions stored on said computer-readable storage medium, the program instructions, when executed, store digital audio data received from a first audio codec of the computer system in a memory device of the computer system, read the digital audio data from the memory device, transfer the digital audio data to a second audio codec of the computer system, allocate a loopback buffer in the memory device for storing the digital audio data, determine that at least one playback DMA channel and at least one capture DMA channel are available in the computer system, and allocate the at least one playback DMA channel and the at least one capture DMA channel for loopback processing, deallocate the at least one capture DMA channel from the loopback processing in response to a determination that an audio recording process has commenced on the computer system, and reallocate the at least one capture DMA channel for the audio recording process.

10. The computer program product of claim 9 wherein said program instructions further:
    mute an analog loopback line of the computer system; and
    set a volume level in a digital loopback path utilized for the reading of the digital audio data.

11. The computer program product of claim 10 wherein said program instructions further:
    stop the at least one playback DMA channel; and
    reset a volume level of the analog loopback line.

* * * * *